United States Patent [19]
Saad et al.

[11] Patent Number: 5,382,552
[45] Date of Patent: Jan. 17, 1995

[54] RARE EARTH-CONTAINING ALKALI SILICATE FRITS AND THEIR USE FOR THE PREPARATION OF PORCELAIN ENAMEL COATINGS WITH IMPROVED CLEANABILITY

[75] Inventors: Elie E. Saad, Burtonsville, Md.; Stuart W. Ries, St. Joseph, Mich.

[73] Assignees: Miles Inc., Pittsburgh, Pa.; Whirlpool Corporation, Benton Harbor, Mich.

[21] Appl. No.: 121,096

[22] Filed: Sep. 14, 1993

[51] Int. Cl.$^6$ ............................................. C03C 8/06
[52] U.S. Cl. ............................. 501/25; 501/57; 501/58; 501/59; 501/64; 501/65; 428/432; 428/469
[58] Field of Search ................... 501/25, 57, 58, 59, 501/64, 65; 428/432, 469

[56] References Cited
U.S. PATENT DOCUMENTS

Re. 29,388  9/1977  Atkinson ........................ 501/64 X
3,969,121  7/1976  Atkinson ........................ 501/64 X
4,537,862  8/1985  Francel et al. .................. 501/25 X

*Primary Examiner*—Karl Group
*Attorney, Agent, or Firm*—Joseph C. Gil; Thomas W. Roy

[57] ABSTRACT

The present invention relates to a rare earth-containing, alkali silicate frit which may be applied to a metal substrate to provide a porcelain enamel coating which has good thermal stability, an acid resistance of A on the PEI scale and improved cleanability, wherein the frit contains, based on the total weight of the frit:

| Oxide | Wt. % |
|---|---|
| $R_2O$ | 10–30 |
| MgO | 0–5 |
| $B_2O_3$ | 0–5 |
| $SiO_2$ | 45–60 |
| $TiO_2$ | 0–10 |
| F | 0.5–5 |
| CoO | 0–3 |
| NiO | 0–5 |
| X | 12–30 | wherein
  R represents an alkali metal and
  X represents a rare earth oxide having an atomic number of 57–60, preferably cerium oxide.

The present invention is also directed to porcelain enamel coatings, especially for appliances, prepared from this rare earth-containing, alkali silicate frit.

30 Claims, No Drawings

RARE EARTH-CONTAINING ALKALI SILICATE FRITS AND THEIR USE FOR THE PREPARATION OF PORCELAIN ENAMEL COATINGS WITH IMPROVED CLEANABILITY

BACKGROUND OF THE INVENTION

1. Field of the Invention

The present invention relates to porcelain enamel frits and their use for the production of porcelain enamel coatings, especially for appliances, having improved cleanability to resist the adherence of food soils, i.e., baked on foods.

2. Description of the Prior Art

There are currently two practices used for the removal of food soils that have been baked on porcelain enamel surfaces, e.g., the interior of oven cavities. One approach is to pyrolize these coatings at elevated temperatures of approximately 500° C. such that the food decomposes leaving a carbon ash residue that can be wiped off. However, this elevated temperature can be hazardous since one may easily be burned by touching the outside of an oven during the cleaning cycle. Furthermore, there is a tendency for porcelain enamels to craze and in some cases flake off when they are repeatedly exposed to such elevated temperatures leaving bare steel surfaces that may eventually rust. By eliminating the pyrolytic cleaning cycle from an oven, the associated safety hazards are avoided and a substantial cost savings is achieved which is beneficial to both the consumer and the manufacturer.

A second approach is to use a strong alkali cleaner having a very high pH ($\cong 12$) combined with mechanical force to remove such baked on foods from porcelain enamel surfaces. This method is also disadvantageous because these highly alkaline cleaners are controversial and must be used with care.

It is an object of the present invention to provide porcelain enamel surfaces which do not require elevated temperatures or highly alkaline cleaners to remove baked on foods.

Surprisingly, it has been found that this object may be achieved in accordance with the present invention by preparing the porcelain enamel coatings from the frits to be described hereinafter.

SUMMARY OF THE INVENTION

The present invention relates to a rare earth-containing, alkali silicate flit which may be applied to a metal substrate to provide a porcelain enamel coating which has good thermal stability, an acid resistance of A on the PEI scale and improved cleanability, wherein the frit contains, based on the total weight of the frit:

| Oxide | Wt. % |
| --- | --- |
| $R_2O$ | 10–30 |
| MgO | 0–5 |
| $B_2O_3$ | 0–5 |
| $SiO_2$ | 45–60 |
| $TiO_2$ | 0–10 |
| F | 0.5–5 |
| CoO | 0–3 |
| NiO | 0–5 |
| X | 12–30 | wherein

R represents an alkali metal and

X represents a rare earth oxide having an atomic number of 57–60, preferably cerium oxide.

The present invention is also directed to porcelain enamel coatings, especially for appliances, prepared from this rare earth-containing, alkali silicate frit.

DETAILED DESCRIPTION OF THE INVENTION

In accordance with the present invention it has been found that there are several variables that contribute to the adherence of food soils to porcelain enamel that can be grouped into two broad categories. These are mechanical and chemical variables. The mechanical variables pertain to the physical bonding mechanisms that take place on a porcelain enamel surface. This adherence is directly related to the smoothness of the enamel surface as well as to the overall hardness of the enamel. It is imperative to have a smooth porcelain enamel surface to eliminate any mechanical bonding sights between the food soils and the enamel.

The overall hardness of the enamel is critical for the long term durability of the coating, since a somewhat softer enamel may more easily scratch thus forming an indentation in which food soils may penetrate and form a mechanical bond. The chemical variables are clearly the chemical bonding mechanisms, and consist of covalent bonds, ionic bonds as well as van der Waal type forces. Once again it is important to minimize these chemical effects in order to eliminate the ability of food soils to stick to a porcelain enamel surface. In brief, to resist the adhesion of baked on food soils, a porcelain enamel surface must be flat, smooth, free from mechanical defects, hard and chemically inert.

In accordance with the present invention it has been found that frit compositions containing rare earth oxides having an atomic number of 57 to 60, i.e., cerium oxide, lanthanum oxide, praseodymium oxide and neodymium oxide, and which contain less than 5% by weight, preferably less than 3% by weight, of boron oxide are excellent for preparing porcelain enamel coatings with improved resistance to the adherence of food. Preferably, the rare earth oxides contain at least 50% by weight, more preferably at least 90% by weight of cerium oxide. Mixtures of the rare earth oxides are also suitable.

Preferred frits according to the invention contain, based on the total weight of the flit:

| Oxide | Wt. % |
| --- | --- |
| $R_2O$ | 10–30 |
| CaO | 0–10 |
| MgO | 0–5 |
| $Al_2O_3$ | 0–5 |
| $B_2O_3$ | 0–5 |
| $P_2O_5$ | 0–5 |
| $SiO_2$ | 45–60 |
| $ZrO_2$ | 0–5 |
| $TiO_2$ | 0–10 |
| F | 0.5–5 |
| CoO | 0–3 |
| NiO | 0–5 |
| X | 12–30 | wherein

R represents an alkali metal, preferably sodium, potassium and/or lithium and

X represents a rare earth oxide having an atomic number of 57–60, preferably cerium oxide.

In these frits the $R_2O$ content is preferably 10 to 25 wt %. The frits generally contain 3 to 15, preferably 5 to 10 wt % of $Na_2O$; 3 to 15, preferably 5 to 10 wt % of $K_2O$; and 0 to 5 wt % of $Li_2O$. The lower limit for $Li_2O$ is preferably 0.5%, more preferably 1 wt %, while the upper limit is preferably 3 wt %; the lower limit for $K_2O$ is more preferably 7 wt %; the upper limit for $Na_2O$ is more preferably 9 wt %; the upper limit for CaO is preferably 5 wt %, more preferably 2 wt %; the lower limit for MgO is preferably 0.5 wt %, preferably 1 wt %, while the upper limit is preferably 3 wt %; the upper limit for $Al_2O_3$ is preferably 2 wt %; the upper limit for $B_2O_3$ is preferably 3 wt %; the upper limit for $P_2O_5$ is preferably 2 wt %; the lower limit for $SiO_2$ is preferably 50 wt % and the upper limit is preferably 58 wt %; the upper limit for $ZrO_2$ is preferably 2 wt %; the lower limit for $TiO_2$ is preferably 2 wt %, more preferably 4 wt %, while the upper limit is preferably 7 wt %; the lower limit for F is preferably 1 wt % and the upper limit is preferably 3 wt %; the upper limit for CoO is preferably 2 wt %, more preferably 1 wt %; the lower limit for NiO is preferably 0.5 wt %, more preferably 1 wt %, while the upper limit is preferably 3 wt %, and the lower limit for X is preferably 15 wt %, more preferably 18 wt %, while the upper limit is preferably 28 wt %.

The components and their amounts in the frit compositions according to the invention have been developed to provide an acceptable porcelain enamel system, while minimizing excess negative charges on the glass surface that contribute to food soil adherence. The presence of the alkali and alkaline earth oxides is important to obtain a low viscosity to improve the flowability of the frit during preparation and application. If the amount of these oxides is too low, then the viscosity of the frit will be too high. However, the amounts of these oxides should not exceed the previously disclosed amounts because this would result in an unacceptable excess of negative charges and poor acid resistance in the final coating. The presence of alumina and phosphorous pentoxide assist in helping to form the glass network, but the disclosed ranges should not be exceeded because of the tendency of these oxides to induce phase separation in a glass system of this type. Phase separation is not desirable for satisfying the requirements necessary for improving the cleanability of porcelain enamel coatings. In addition, excess alumina reduces the acid resistance of the final coating and excess phosphorous pentoxide reduces the surface tension of the coating.

Fluorine is an acceptable and relatively inexpensive fluxing agent for glasses. However, the presence of fluorine in amounts greater than those disclosed results in too high of a concentration of negative ions in the glass and also affects the acid resistance of the coating. Cobalt and nickel are present in the frit to enhance color and to aid in the bonding of the porcelain enamel to the substrate. The amounts of cobalt and nickel are primarily limited by cost factors and because it is well known that excess metals in a porcelain enamel type glass system will cause rapid crystallization and metalization which are detrimental to the performance of the coating.

The lower limit for the rare earth oxides is necessary because even though systems having less than 12 weight percent of these oxides demonstrate initial cleanability, the cleanability deteriorates after a few cycles unless the rare earth oxide content is maintained within the disclosed ranges. The upper limit is controlled by the requirement that higher amounts of cerium oxide cause rapid crystallization leading to an uneven surface.

The frit compositions according to the invention are suitable for preparing porcelain enamel coatings by using either a dry or a wet process. The electrostatic method for applying frits to a metallic substrate is well known and described in U.S. Pat. No. 3,928,668, the disclosure of which is herein incorporated by reference.

Whether applied by the wet or the dry process, the frit may be applied directly or indirectly to a metal substrate, preferably steel. By "indirectly" it is meant that the frit according to the present invention is applied to a ground coat, e.g., a bonding coat. If the steel has been pickled the frit according to the present invention may be directly applied to the metal substrate. If the steel has only been cleaned, it is recommended to apply a bonding coat prior to applying the frit according to the present invention. In accordance with the method of application of the frit composition, the frit is applied in an amount of approximately 30 grams per square foot. This amount of application results upon firing in a porcelain enamel having a thickness of about 5 mils.

The resulting porcelain enamel coatings were found to be uniform, color stable and resistant to chemical attack by acids, in addition to having improved resistance to the adhesion of food soils. It is important for the enamels prepared from the frits according to the present invention to possess good acid resistance. When tested in accordance with the PEI—Porcelain Enamel Institute—acid resistance test, enamels prepared from the frits of the present invention were consistently rated A.

The frits according to the present invention are especially suited for preparing porcelain enamel coatings for appliances, especially ovens.

EXAMPLES

Preparation of a Frit Composition

The following is a description of the procedure which was used for preparing a composition within the scope of the invention. The compositions of raw materials set forth in Table 1 were weighed, dry blended and charged into a glass melting furnace.

The compositions were melted in a laboratory scale gas-air fired rotary smelter for about 30–40 minutes at a temperature of 1100° to 1400° C. The resulting molten glass was poured into water to produce the frit. The frit material was mixed with 0.22% by weight of dimethylsiloxane oil and comminuted until 94 to 98% by weight of the frit had an average particle size of less than 45 micrometers (200 mesh).

The frit was used to provide a porcelain enamel coating on steel samples using conventional electrostatic and wet application techniques. In the electrostatic application cleaned only steel coupons (20 gauge extra low carbon cleaned steel) as well as ground coated coupons were used as the substrate.

In the wet application process a slip was formed by blending the 100 parts of the frit with 4 parts clay, 0.25 parts bentonite, 0.25 parts potassium carbonate, 0.125 parts sodium nitrate, 0.03 parts Saladiser Gum 210 (available from Speciality Blends, Belcamp, MD) and 40 parts water. The blend was comminuted to the same fineness as in the electrostatic application.

The frits were applied and the samples were fired at a temperature of 730° to 870° C. Holding times of 3 to 10 minutes were used to simulate commercial firing conditions.

Table I sets forth both comparison porcelain enamel frit compositions and porcelain enamel frit compositions according to the invention that were prepared via a statistical experimental design to achieve optimum ease of cleanability in the enamel surface. The cleanability test for this purpose was primarily the modified "AHAM" test for pyrolytic cleanability testing. For this purpose, the pyrolytic cycle was omitted and the soils were removed mechanically. The mechanical removal involved three stages. In the first stage fingers were used to remove the food residue. In the second stage a spatula was used to remove any food that was not released in the first stage. In the final stage a sponge was used to apply soap and water to eliminate the final stains on the porcelain enamel surface. The ease with which baked food soils were removed from the surface of the enamel is set forth at the bottom of Table I for the different frit compositions. A value of 1 represents the greatest ease and a value of 5 represents the most difficult. The second number represents the number of times the test was repeated.

remove baked on foods, wherein said frit contains, based on the total weight of the frit:

| Oxide | Wt. % |
|---|---|
| $R_2O$ | 10-30 |
| MgO | 0-5 |
| $B_2O_3$ | 0-5 |
| $SiO_2$ | 45-60 |
| $TiO_2$ | 0-10 |
| F | 0.5-5 |
| CoO | 0-2 |
| NiO | 0-5 |
| X | 12-30 | wherein

R Represents an alkali metal and

X represents a rare earth oxide having an atomic number of 57-60.

2. The alkali silicate frit of claim 1 wherein $R_2O$ contains 3 to 15 wt % of $Na_2O$, 3 to 15 wt % of $K_2O$ and 0 to 5 wt % of $Li_2O$, wherein said percentages are based on the weight of the frit.

3. The alkali silicate frit of claim 1 wherein X represents cerium oxide.

| | Example No. (amounts in wt %) | | | | | | | | | | | |
|---|---|---|---|---|---|---|---|---|---|---|---|---|
| Oxide | 1 comp | 2 Comp | 3 Comp | 4 Comp | 5 Comp | 6 Comp | 7 comp | 8 | 9 Comp | 10 Comp | 11 Comp | 12 Comp |
| $Li_2O$ | 2.43 | 0.00 | 2.05 | 2.44 | 2.01 | 0.00 | 2.05 | 1.09 | 2.44 | 2.01 | 2.02 | 0.00 |
| $K_2O$ | 9.19 | 7.66 | 7.74 | 9.22 | 7.62 | 7.42 | 7.74 | 7.63 | 9.22 | 7.62 | 7.66 | 7.42 |
| $Na_2O$ | 7.08 | 5.90 | 5.97 | 7.10 | 5.88 | 5.72 | 5.97 | 5.88 | 7.10 | 5.88 | 5.90 | 5.72 |
| CaO | 9.12 | 7.60 | 7.68 | 9.15 | 5.83 | 7.36 | 7.68 | 0.00 | 9.15 | 5.83 | 7.24 | 7.36 |
| MgO | 0.16 | 0.13 | 0.13 | 0.16 | 0.13 | 0.13 | 0.13 | 0.13 | 0.16 | 0.13 | 0.13 | 0.13 |
| $B_2O_3$ | 0.00 | 0.00 | 0.00 | 0.00 | 0.00 | 0.00 | 0.00 | 0.00 | 0.00 | 0.00 | 0.00 | 0.00 |
| $SiO_2$ | 58.35 | 48.84 | 39.16 | 58.79 | 48.63 | 47.31 | 39.12 | 48.67 | 58.79 | 48.63 | 48.85 | 27.31 |
| $TiO_2$ | 6.50 | 5.41 | 5.47 | 3.30 | 0.00 | 4.94 | 5.47 | 5.39 | 3.30 | 0.00 | 0.00 | 4.94 |
| F | 1.54 | 0.00 | 1.30 | 1.55 | 0.00 | 0.00 | 1.30 | 1.28 | 1.55 | 0.00 | 0.00 | 0.00 |
| CoO | 0.02 | 0.20 | 0.21 | 0.24 | 0.02 | 0.02 | 0.20 | 0.02 | 0.24 | 0.02 | 0.02 | 0.02 |
| NiO | 0.00 | 2.02 | 2.05 | 2.44 | 2.02 | 0.00 | 2.05 | 2.02 | 2.44 | 2.02 | 0.00 | 0.00 |
| $CeO_2$ | 5.60 | 22.22 | 28.29 | 5.61 | 27.86 | 27.11 | 28.29 | 27.88 | 5.61 | 27.86 | 27.99 | 27.11 |
| Soil Test (powder) | 5/1 | 5/1 | 3/1 | 5/2 | 5/1 | 3/1 | 3/1 | 2/16 | 5/2 | 5/1 | 5/1 | 3/1 |
| Soil Test (wet) | 5/1 | 5/1 | 3/1 | — | 3/1 | 5/1 | 4/1 | 5/1 | 4/2 | 3/1 | 5/2 | 5/1 |

| Oxide | 13 Comp | 14 Comp | 15 | 16 | 17 | 18 | 19 | 20 | 21 | 22 Comp | 23 | 24 Comp | 25 Comp | 26 Comp | 27 | 28 | 29 |
|---|---|---|---|---|---|---|---|---|---|---|---|---|---|---|---|---|---|
| $Li_2O$ | 2.05 | 2.10 | 1.1 | 1.1 | 1.16 | 1.2 | 1.13 | 1.17 | 1.21 | — | — | 2.14 | — | 2.01 | — | 2.10 | 1.97 |
| $K_2O$ | 7.74 | 7.94 | 7.63 | 8.50 | 9.43 | 10.41 | 7.91 | 8.15 | 8.47 | 8.88 | 8.69 | 8.69 | 8.33 | 8.17 | 8.17 | 8.51 | 8.00 |
| $Na_2O$ | 5.97 | 6.09 | 8.88 | 6.48 | 7.11 | 7.79 | 6.10 | 6.28 | 6.53 | 6.85 | 6.76 | 6.70 | 6.42 | 6.29 | 6.29 | 6.56 | 6.17 |
| CaO | 7.68 | 7.87 | 0.00 | 0.00 | 0.00 | 0.00 | 0.00 | 0.00 | 0.00 | — | — | — | — | — | — | — | — |
| MgO | 0.13 | 0.11 | 0.13 | 0.13 | 0.14 | 0.14 | 1.27 | 1.30 | 2.56 | 1.41 | 1.38 | 1.38 | 1.33 | 1.30 | 1.30 | 1.35 | 1.27 |
| $B_2O_3$ | 0.00 | 0.00 | 0.00 | 0.00 | 0.00 | 0.00 | 0.00 | 2.00 | 2.10 | 2.18 | 2.13 | 2.13 | 2.06 | 2.00 | 2.00 | 2.09 | 1.96 |
| $SiO_2$ | 39.29 | 50.62 | 48.67 | 50.90 | 53.25 | 55.75 | 50.46 | 51.95 | 54.00 | 56.63 | 55.42 | 55.41 | 53.13 | 52.06 | 52.06 | 54.25 | 51.00 |
| $TiO_2$ | 5.47 | 5.39 | 5.39 | 5.55 | 5.71 | 5.88 | 5.59 | 5.76 | 5.98 | — | — | — | 6.17 | 6.04 | 6.04 | — | 5.97 |
| F | 1.30 | 0.00 | 1.28 | 1.32 | 1.36 | 1.40 | 1.33 | 1.37 | 1.42 | — | 2.14 | — | — | — | 2.01 | 2.10 | 1.97 |
| CoO | 0.20 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| NiO | 2.05 | 2.10 | 2.02 | 2.07 | 2.14 | 2.20 | 2.05 | 2.15 | 2.24 | 2.34 | 2.29 | 2.29 | 2.20 | 2.15 | 2.15 | 2.25 | 2.13 |
| $CeO_2$ | 28.30 | 22.96 | 27.88 | 23.90 | 19.68 | 15.21 | 24.10 | 19.84 | 15.47 | 21.62 | 21.16 | 21.16 | 20.28 | 19.88 | 19.88 | 20.71 | 19.40 |
| Soil Test (powder) | 3/1 | 5/1 | 1/15 | 1/15 | 1/12 | 1/12 | 2/5 | 1/20 | 2/20 | — | — | — | — | — | — | — | — |
| Soil Test (wet) | 4/1 | 4/1 | — | — | — | — | — | 1/20 | — | 5/1 | 2/1 | 4/1 | 5/1 | 3/1 | 1/1 | 2/1 | 1/1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An alkali silicate frit which may be applied to a metal substrate to provide a porcelain enamel coating which has sufficient thermal stability to be suitable as a coating for the interior of oven cavities, has an acid resistance of A on the PEI scale and does not require elevated temperatures or highly alkaline cleaners to 4. The alkali silicate frit of claim 1 wherein said frit contains, based on the total weight of the frit:

| Oxide | Wt. % |
|---|---|
| $Li_2O$ | 1-5 |
| $K_2O$ | 5-10 |
| $Na_2O$ | 5-10 |
| MgO | 0-5 |
| $B_2O_3$ | 0-5 |
| $SiO_2$ | 45-60 |
| $TiO_2$ | 2-10 |
| F | 1-5 |

| Oxide | Wt. % |
|---|---|
| CoO | 0-2 |
| NiO | 0-5 |
| X | 15-30 | wherein

X represents cerium oxide.

5. The alkali silicate frit of claim 1 wherein said frit contains, based on the total weight of the frit, 1-5 wt % NiO.

6. The alkali silicate frit of claim 4 wherein said frit contains, based on the total weight of the frit, 1-5 wt % NiO.

7. An alkali silicate frit which may be applied to a metal substrate to provide a porcelain enamel coating which has sufficient thermal stability to be suitable as a coating for the interior of oven cavities, has an acid resistance of A on the PEI scale and does not require elevated temperatures or highly alkaline cleaners to remove baked on foods, wherein said frit contains, based on the total weight of the frit:

| Oxide | Wt. % |
|---|---|
| $Li_2O$ | 0-5 |
| $K_2O$ | 5-10 |
| $Na_2O$ | 5-10 |
| CaO | 0-10 |
| MgO | 0-5 |
| $Al_2O_3$ | 0-5 |
| $B_2O_3$ | 0-5 |
| $P_2O_4$ | 0-5 |
| $SiO_2$ | 45-60 |
| $ZrO_2$ | 0-5 |
| $TiO_2$ | 0-10 |
| F | 0.5-5 |
| CoO | 0-2 |
| NiO | 0-5 |
| X | 12-30 | wherein

X represents a rare earth oxide having an atomic number of 57-60.

8. The alkali silicate frit of claim 7 wherein X represents cerium oxide.

9. The alkali silicate frit of claim 7 wherein said frit contains, based on the total weight of the frit:

| Oxide | Wt. % |
|---|---|
| $Li_2O$ | 1-5 |
| $K_2O$ | 5-10 |
| $Na_2O$ | 5-10 |
| CaO | 0-10 |
| MgO | 0-5 |
| $Al_2O_3$ | 0-5 |
| $B_2O_3$ | 0-5 |
| $P_2O_5$ | 0-5 |
| $SiO_2$ | 45-60 |
| $ZrO_2$ | 0-5 |
| $TiO_2$ | 2-10 |
| F | 1-5 |
| CoO | 0-2 |
| NiO | 0-5 |
| X | 15-30 | wherein

X represents cerium oxide.

10. The alkali silicate frit of claim 7 wherein said frit contains, based on the total weight of the frit, 1-5 wt % NiO.

11. The alkali silicate frit of claim 9 wherein said frit contains, based on the total weight of the frit, 1-5 wt % NiO.

12. A metal substrate which has been coated directly or indirectly with an alkali silicate frit to provide a porcelain enamel coating which has sufficient thermal stability to be suitable as a coating for the interior of oven cavities, has an acid resistance of A on the PEI scale and does not require elevated temperatures or highly alkaline cleaners to remove baked on foods, wherein said frit contains, based on the total weight of the frit:

| Oxide | Wt. % |
|---|---|
| $R_2O$ | 10-30 |
| MgO | 0-5 |
| $B_2O_3$ | 0-5 |
| $SiO_2$ | 45-60 |
| $TiO_2$ | 0-10 |
| F | 0.5-5 |
| CoO | 0-2 |
| NiO | 0-5 |
| X | 12-30 | wherein

R represents an alkali metal and

X represents a rare earth oxide having an atomic number of 57-60.

13. The coated metal substrate of claim 12 wherein $R_2O$ contains 3 to 15 wt % of $Na_2O$, 3 to 15 wt % of $K_2O$ and 0 to 5 wt % of $Li_2O$, wherein said percentages are based on the weight of the frit.

14. The coated metal substrate of claim 12 wherein X represents cerium oxide.

15. The coated metal substrate of claim 12 wherein said frit contains, based on the total weight of the frit:

| Oxide | Wt. % |
|---|---|
| $Li_2O$ | 1-5 |
| $K_2O$ | 5-10 |
| $Na_2O$ | 5-10 |
| MgO | 0-5 |
| $B_2O_3$ | 0-5 |
| $SiO_2$ | 45-60 |
| $TiO_2$ | 2-10 |
| F | 1-5 |
| CoO | 0-2 |
| NiO | 0-5 |
| X | 15-30 | wherein

X represents cerium oxide.

16. The coated metal substrate of claim 12 wherein said frit contains, based on the total weight of the frit, 1-5 wt % NiO.

17. The coated metal substrate of claim 15 wherein said frit contains, based on the total weight of the frit, 1-5 wt % NiO.

18. A metal substrate which has been coated directly or indirectly with an alkali silicate frit to provide a porcelain enamel coating which has sufficient thermal stability to be suitable as a coating for the interior of oven cavities, has an acid resistance of A on the PEI scale and does not require elevated temperatures or highly alkaline cleaners to remove baked on foods, wherein said frit contains, based on the total weight of the frit:

| Oxide | Wt. % |
| --- | --- |
| Li$_2$O | 0-5 |
| K$_2$O | 5-10 |
| Na$_2$O | 5-10 |
| CaO | 0-10 |
| MgO | 0-5 |
| Al$_2$O$_3$ | 0-5 |
| B$_2$O$_3$ | 0-5 |
| P$_2$O$_5$ | 0-5 |
| SiO$_2$ | 45-60 |
| ZrO$_2$ | 0-5 |
| TiO$_2$ | 0-10 |
| F | 0.5-5 |
| CoO | 0-2 |
| NiO | 0-5 |
| X | 12-30 | wherein

X represents a rare earth oxide having an atomic number of 57-60.

19. The coated metal substrate of claim 18 wherein X represents cerium oxide.

20. The coated metal substrate of claim 18 wherein said frit contains, based on the total weight of the frit:

| Oxide | Wt. % |
| --- | --- |
| Li$_2$O | 1-5 |
| K$_2$O | 5-10 |
| Na$_2$O | 5-10 |
| CaO | 0-10 |
| MgO | 0-5 |
| Al$_2$O$_3$ | 0-5 |
| B$_2$O$_3$ | 0-5 |
| P$_2$O$_5$ | 0-5 |
| SiO$_2$ | 45-60 |
| ZrO$_2$ | 0-5 |
| TiO$_2$ | 2-10 |
| F | 1-5 |
| CoO | 0-2 |
| NiO | 0-5 |
| X | 15-30 | wherein

X represents cerium oxide.

21. The coated metal substrate of claim 18 wherein said frit contains, based on the total weight of the frit, 1-5 wt % NiO.

22. The coated metal substrate of claim 20 wherein said frit contains, based on the total weight of the frit, 1-5 wt % NiO.

23. The alkali silicate frit of claim 5 wherein said frit contains, based on the total weight of the frit, 1-5 wt % MgO.

24. The alkali silicate frit of claim 6 wherein said frit contains, based on the total weight of the frit, 1-5 wt % MgO.

25. The alkali silicate frit of claim 11 wherein said frit contains, based on the total weight of the frit, 1-5 wt % MgO.

26. The alkali silicate frit of claim 12 wherein said frit contains, based on the total weight of the frit, 1-5 wt % MgO.

27. The coated metal substrate of claim 16 wherein said frit contains, based on the total weight of the frit, 1-5 wt % MgO.

28. The coated metal substrate of claim 17 wherein said frit contains, based on the total weight of the frit, 1-5 wt % MgO.

29. The coated metal substrate of claim 21 wherein said frit contains, based on the total weight of the frit, 1-5 wt % MgO.

30. The coated metal substrate of claim 22 wherein said frit contains, based on the total weight of the frit, 1-5 wt % MgO.

* * * * *